United States Patent
Kegel et al.

(10) Patent No.: US 11,363,083 B2
(45) Date of Patent: Jun. 14, 2022

(54) MANAGING STREAMED AUDIO COMMUNICATION SESSIONS

(71) Applicant: BRITISH TELECOMMUNICATIONS PUBLIC LIMITED COMPANY, London (GB)

(72) Inventors: Ian Kegel, London (GB); Karis Bailey, London (GB); Martin Reed, London (GB); Peter Hughes, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 5 days.

(21) Appl. No.: 16/956,121

(22) PCT Filed: Dec. 21, 2018

(86) PCT No.: PCT/EP2018/086620
§ 371 (c)(1),
(2) Date: Jun. 19, 2020

(87) PCT Pub. No.: WO2019/122343
PCT Pub. Date: Jun. 27, 2019

(65) Prior Publication Data
US 2020/0329084 A1    Oct. 15, 2020

(30) Foreign Application Priority Data
Dec. 22, 2017 (EP) ..................................... 17210377

(51) Int. Cl.
*H04L 65/4038* (2022.01)
*G06F 3/16* (2006.01)
(Continued)

(52) U.S. Cl.
CPC .......... *H04L 65/4038* (2013.01); *G06F 3/165* (2013.01); *H04L 65/4061* (2013.01); *H04R 3/12* (2013.01)

(58) Field of Classification Search
CPC . H04L 65/4038; H04L 65/4061; G06F 3/165; H04R 3/12
See application file for complete search history.

(56) References Cited

U.S. PATENT DOCUMENTS 6,466,550 B1   10/2002  Foster et al.
7,042,891 B2   5/2006   Oberman et al.
(Continued)

FOREIGN PATENT DOCUMENTS

CN   102469220   5/2012
CN   103703719   4/2014
(Continued)

OTHER PUBLICATIONS

International Search Report and Written Opinion of the ISA for PCT/EP2018/086620 dated Jan. 31, 2019, 12 pages.
(Continued)

*Primary Examiner* — Azizul Choudhury
(74) *Attorney, Agent, or Firm* — Nixon & Vanderhye P.C.

(57) ABSTRACT

Methods and apparatus are disclosed for managing streamed audio communication sessions between user devices (50) configured to send streamed data indicative of received audio contributions from respective participants in a multiple-participant audio communication session via a communications network to one or more other user devices (50) for conversion to audio representations of said received audio contributions for other participants. The method comprises monitoring audio contributions from respective participants, and in response to detection therefrom that a first participant is beginning to make an audio contribution at a
(Continued)

Two-Party Embodiment (No Conference Bridge Needed)

first one of said user devices (50a) after a period of silence, providing a signal for at least one of said other user devices (50b, 50c, 50d) indicating that the first participant is beginning to make an audio contribution; and in response to receipt at said at least one other user device (50b, 50c, 50d) of such a signal, triggering a predetermined audible indication for a participant at said at least one other user device (50b, 50c, 50d) that said first participant is beginning to make an audio contribution.

20 Claims, 7 Drawing Sheets

(51) Int. Cl.
  *H04L 65/4061*  (2022.01)
  *H04R 3/12*  (2006.01)

(56) References Cited

U.S. PATENT DOCUMENTS

| | | | |
|---|---|---|---|
| 8,358,599 | B2 | 1/2013 | Shaffer et al. |
| 9,426,087 | B2 | 8/2016 | Zealey et al. |
| 2002/0118640 | A1 | 8/2002 | Oberman et al. |
| 2005/0066170 | A1 | 3/2005 | Queau et al. |
| 2007/0165820 | A1 | 7/2007 | Krantz et al. |
| 2010/0284310 | A1 | 11/2010 | Shaffer et al. |
| 2011/0060591 | A1* | 3/2011 | Chanvez .......... H04M 3/42221 704/270 |
| 2011/0184736 | A1 | 7/2011 | Slotznick |
| 2011/0283008 | A1* | 11/2011 | Smelyansky ............ H04N 7/15 709/231 |
| 2014/0022956 | A1 | 1/2014 | Ramalho et al. |
| 2014/0078938 | A1 | 3/2014 | Lachapelle et al. |
| 2014/0228011 | A1* | 8/2014 | Goel ................... H04L 65/4061 455/416 |
| 2014/0258413 | A1 | 9/2014 | Brieskorn |
| 2014/0269556 | A1 | 9/2014 | Mechaley, Jr. |
| 2015/0172202 | A1 | 6/2015 | Zealey et al. |
| 2017/0242653 | A1* | 8/2017 | Lang ...................... G10L 15/22 |

FOREIGN PATENT DOCUMENTS

| | | |
|---|---|---|
| CN | 105099949 | 11/2015 |
| EP | 1246395 | 10/2002 |
| EP | 1978652 | 10/2008 |
| GB | 2463153 | 3/2010 |
| WO | 2006/105275 | 10/2006 |

OTHER PUBLICATIONS

Search Report for EP17210377.2 dated Apr. 19, 2018, 8 pages.
Search Report for GB1721775.3 dated Jun. 21, 2018, 3 pages.
ITU-T, "Series P: Terminals and Subjective and Objective Assessment Methods", Effect of Delays on Telemeeting quality, International Telecommunications Union, P.1305, Jul. 2016, 32 pages.
ITU-T, "Series G: Transmissions Systems and Media, Digital Systems and Networks", One-way transmission time, G.114, May 2003, 20 pages.
Office Action for Chinese Application No. 201880082738.3 dated Dec. 1, 2021 (7 pages).

* cited by examiner

Figure 1 - The Turn-Taking Process

Figure 2: Conversation flow with delay and simultaneous responses

Figure 3 - Conference System including Conference Server/Bridge

Figure 4: Two-Party Embodiment (No Conference Bridge Needed)

Figure 5: Multi-Party Embodiment with Audio and Messaging bridges

Figure 6: Functional Modules within Messaging Bridge.

Figure 7

MANAGING STREAMED AUDIO COMMUNICATION SESSIONS

This application is the U.S. national phase of International Application No. PCT/EP2018/086620 filed Dec. 21, 2018 which designated the U.S. and claims priority to EP Patent Application No. 17210377.2 filed Dec. 22, 2017, the entire contents of each of which are hereby incorporated by reference.

TECHNICAL FIELD

The present invention relates to streamed audio communication between participants, and in particular to methods, apparatus and systems for managing digitally-streamed audio communication sessions such as audio-calls and audio-conferences between two or more participants using user-devices or user terminals such as telephones or computing devices with audio (and possibly video) input and output modules.

BACKGROUND

Conversation Analysis (CA) is a branch of linguistics which studies the way humans interact. Since the invention is based on an understanding of interactions between participants in conversations, and how the quality of the interactions is degraded by transmission delay, we first note some of the knowledge from Conversation Analysis.

In a free conversation the organisation of the conversation, in terms of who speaks when, is referred to as 'turn-taking'. This is implicitly negotiated by a multitude of verbal cues within the conversation and also by non-verbal cues such as physical motion and eye contact. This behaviour has been extensively studied in the discipline of Conversation Analysis and leads to useful concepts such as:

The Turn Constructional Unit (TCU), which is the fundamental segment of speech in a conversation—essentially a piece of speech that constitutes an entire 'turn'.

The Transition Relevance Place (TRP), which indicates where a turn or floor exchange can take place between speakers. TCUs are separated by TRPs.

Figure 1:
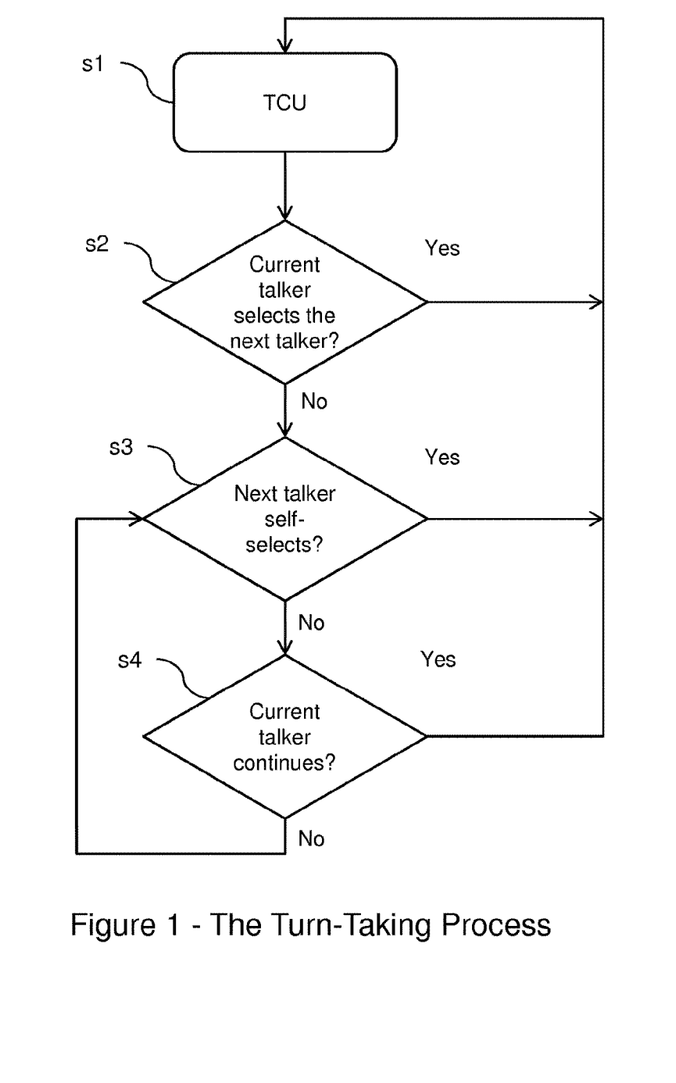
FIG. 1 illustrates a basic conversational turn-taking procedure.

These enable what is referred to as a basic turn-taking process to take place, a simplified example of which is shown in FIG. 1, which will be discussed in more detail later. Briefly, in this example, as a TCU comes to an end the next talker is essentially determined by the next participant to start talking. Changes in talker take place at a TCU, though if no other participants start talking, the original talker can continue after the TCU. This decision process has been observed to lead generally to the following conference characteristics:

(i) Overwhelmingly, only one participant talks at a time.

(ii) Occurrences of more than one talker at a time are common, but brief.

(iii) Transitions from one turn to the next—with no gap or overlap—are common.

(iv) The most frequent gaps between talkers are in the region of 200 ms. Gaps of more than 1 second are rare.

(v) It takes talkers at least 600 ms to plan a one-word utterance and somewhat longer for sentences with multiple words. Combining this figure with the typical gap length implies that listeners are generally very good at predicting an approaching TRP.

Significantly, it is noted here that transmission delay on communication links between the respective conference participants can severely disrupt the turn-taking process because the identity of the next participant to start talking is disrupted by the delay.

In particular, delay in conference systems can cause significant problems to talkers compared to normal face-to-face meetings. One example of such a problem is so-called "double-talk," where two (or more) people start to speak at the same time (i.e. each at the start of a "turn constructional unit"), each initially being unaware (due to transmission or other delay) that the other has also started to speak. Due to the delay, they only become aware of this problem after they have started talking, after which confusion may arise, sometimes with both talkers stopping, then starting again (sometimes both talking over each other again). For this and other reasons, designers generally try to reduce delay—there are many prior techniques attempting to address this issue (the reduction of delay).

Figure 2:
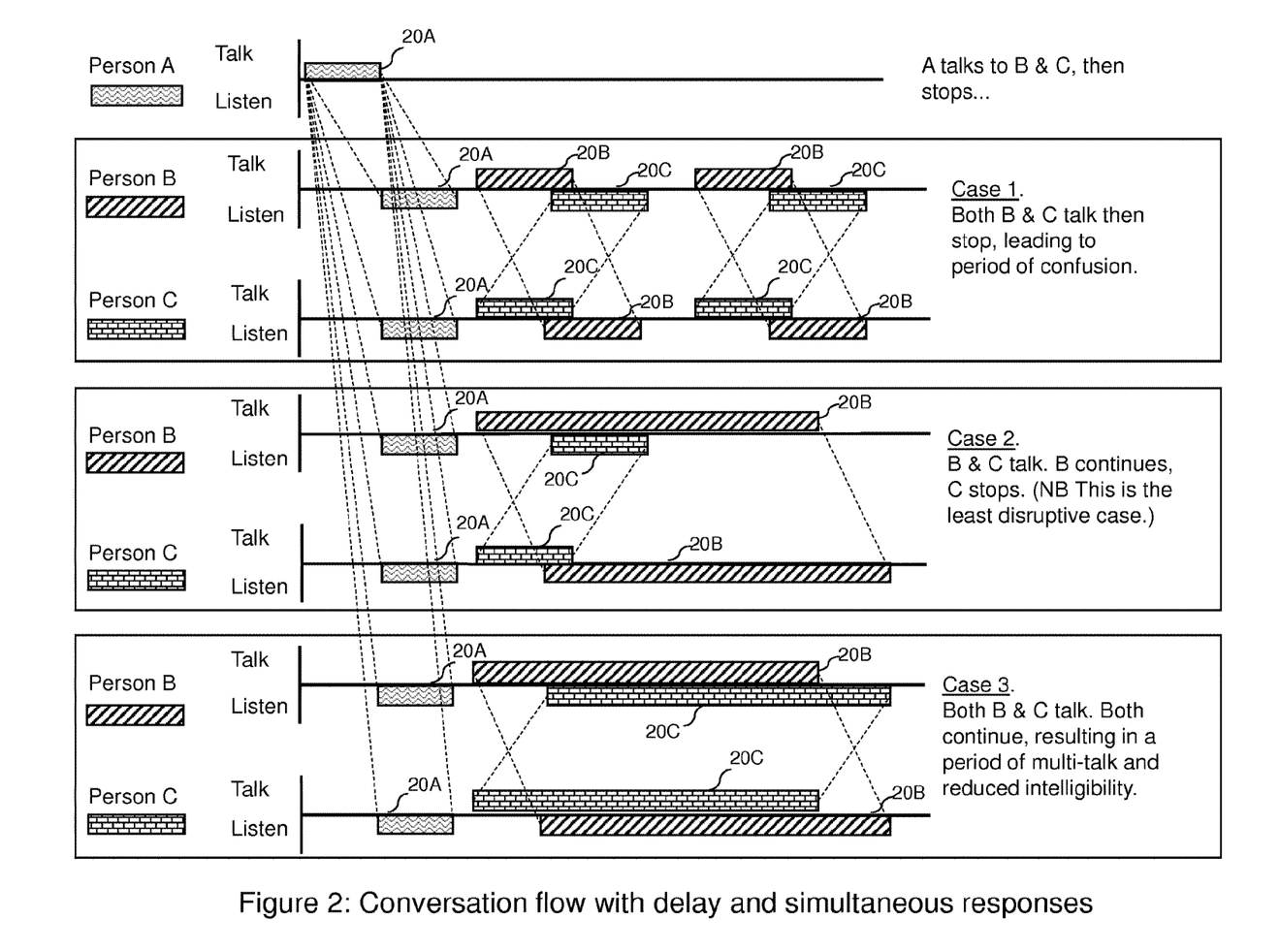
FIG. 2 shows some possible outcomes in a three-way conference in a situation where two participants attempt to respond to an audio contribution from another participant.

An example of the impact of delay is shown in FIG. 2, which shows three possible outcomes (noting that there may be many other possible outcomes) in a three-way conference arising from a situation where person or participant B and person/participant C respond to a question or comment from (or otherwise wish to talk after an audio contribution from) person/participant A. In the absence of significant delay or significant effects thereof, the next person to 'have the floor' is usually the first person to start talking. This is in line with normal conversation turn-taking. Unfortunately if there is delay present none of the participants know who started talking first, resulting in confusion.

In FIG. 2, the question, comment or other such audio contribution from Person A is represented in each section by a zigzag-patterned block 20A. In the top section of the figure, representing occurrences at Person A's terminal, block 20A appears above the horizontal axis (which represents time), indicating that it is the audio contribution of Person A when talking. In the lower three sections of the figure, which represent occurrences at the terminals of Persons B and C in each of three scenarios or cases, block 20A appears below the axis, indicating that it is the audio contribution of Person A when this is heard by Persons B and C, who are listening. It will be noted that the audio contribution represented by zigzag-patterned block 20A is heard (by Persons B and C) a short time after it is spoken by Person A, due to any delay (transmission delay, processing delay, etc.).

The lower three sections of the figure represent possible subsequent occurrences at the terminals of Persons B and C in the following three cases, each of which may occur if Persons B and C both wish to start talking (or "take the floor") after they have heard (or think they have heard) the end of Person A's audio contribution. In these sections, audio contributions from Person B are represented in each instance by diagonally-patterned blocks 20B, and audio contributions from Person C are represented in each instance by brick-patterned blocks 20C.

Case 1: Both B and C start to talk, then both stop talking when they realise the other is already talking (which they will each realise shortly after the other person actually started talking, due to any delay), leading to a period of confusion.

Case 2: B and C talk. B continues but C stops on realising that B is already talking. (NB This is the least disruptive of the three cases.)

Case 3: Both B and C talk. Both continue (possibly still not realising the other is already talking, or possibly because they each feel that the other is interrupting them), resulting in a period of double-talk (or possibly "multi-talk" if A also starts talking again at about the same time, or if there are other parties involved), and reduced intelligibility.

Whichever situation occurs, there will generally be an impact on the conversation flow, which may be significant, leading to confusion, frustration, or wasted time, or possibly more serious, if one party thinks another is interrupting them, ignoring them or otherwise being rude.

Even using the best delay reduction techniques, there is often considerable delay in multi-party conferencing systems, or at least sufficient delay that problems such as the above can occur. This may simply be because there is a finite time required for data indicative of respective audio contributions to be encoded ready for transmission to a remote terminal, transmitted via a communications network (and possibly a conference bridge) to that remote terminal, then decoded and played to a listener at that remote terminal. Delay may also be due to intermediate processing (e.g. at a conference bridge (discussed later), or due to the provision of effects such as spatialized audio) or may be due to the geographical placement of a conference bridge, which may be sufficiently remotely located as to cause delay to be incurred even if the participants interacting via it are geographically close to each other.

The end-to-end delay in a telecommunications system, often referred to as latency, or mouth-to-ear delay, can never be zero. In a modern digital system the latency is made up of a combination of delays—e.g. propagation delay, buffering, processing delay etc., and can typically be anywhere between 30 ms to 1 s. Unfortunately excessive latency can have a devastating impact on conversation quality. This is discussed in ITU-T recommendation G.114, which states the following: "Although a few applications may be slightly affected by end-to-end (i.e., "mouth-to-ear" in the case of speech) delays of less than 150 ms, if delays can be kept below this figure, most applications, both speech and non-speech, will experience essentially transparent interactivity", and " . . . delays above 400 ms are unacceptable for general network planning purposes". Details of the impact of delays on teleconference systems are described in ITU-T P.1305.

Referring briefly to prior patent documents, there are many which relate to techniques aiming to keep the latency as low as possible, examples of which are as follows:

United States patent application US2015/0172202 (Zealey et al), entitled "Reduced System Latency for Dominant Speaker", relates to digital media systems, and in particular to digital media systems having data processing that aims to mitigate signal latency.

US2002/0118640 A1 (Oberman et al), entitled "Dynamic Selection of Lowest Latency Path in a Network Switch", relates to systems and methods for routing data packets through network switches, with a view to routing packets efficiently whether a destination output port is available or is unavailable due to other packet traffic.

US2014/0022956 (Ramalho et al), entitled "System and Method for Improving Audio Quality During Web Conferences Over Low-Speed Network Connections", relates to software web-conferencing.

These techniques focus on optimising the mouth-to-ear transmission path to keep the latency low.

US2010/0284310 (Shaffer et al) and a resulting patent, U.S. Pat. No. 8,358,599B2 relate to a system for providing audio highlighting of conference participant playout. It identifies a first participant in a conference as a "principal participant", and adds audible or audio highlighting to a live conference or a playout of a recorded conference such that contributions by principal, or key, participants may be readily identified.

As discussed above, delay in two-party or larger multi-party speech communication can be a problem, often causing confusion in talkers whereby they "talk over" each other. This delay is often caused by intermediary processing systems (such as a conference bridge), but may simply be caused by transmission delay. While reducing or minimising delay is generally beneficial, it may not be possible to do so enough to prevent it from causing problems in relation to audio communication sessions.

SUMMARY OF THE INVENTION

Preferred embodiments relate to techniques for reducing the impact of delay/latency in voice calls or other two-party or multi-party audio-conferences. Such delay/latency may be due to intermediary processing (e.g. processing and re-distribution at a conference bridge, or for effects such as spatialized audio), or may be due to geographical issues, for example.

In particular, preferred embodiments concern the problem of "double-talk", where two (or more) participants start talking at about the same time, each initially unaware (due to delay) that another has also just started to talk. They may then become aware that another has also just started talking, leading to confusion with (for example) both/each stopping, re-starting (sometimes talking over each other again), etc.

As discussed above, techniques exist which attempt to reduce delay. Instead of or as well as this, preferred embodiments act in order to reduce the effect of such delay by causing participants to hear pre-emptive audio (and/or possibly visual) cues in advance of the start of any reproduction of other participant's current audio contributions, the pre-emptive cues being triggered or sent via a fast/direct signalling channel which should be faster than that used for the actual audio signals (e.g. avoiding audio processing in a conference bridge or otherwise). By triggering and causing other participants to hear such pre-emptive sounds (generally "pre-stored" at the other participants' audio terminals) indicative of a "first talker" having started to talk before those other participants started talking (and before the actual audio data arrives from the "first talker", the pre-emptive sounds having been triggered via a (generally faster) signalling channel), other participants may be prevented from thinking they are the first talker and therefore starting/continuing to talk, thereby reducing "double-talk".

According to a first aspect of the invention, there is provided a method of managing a streamed audio communication session between a plurality of user devices, the user devices being configured to send streamed data indicative of received audio contributions from respective participants in a multiple-participant audio communication session via a communications network to one or more other user devices for conversion to audio representations of said received audio contributions for one or more respective other participants; the method comprising:

monitoring audio contributions from respective participants, and in response to detection therefrom that a first participant is beginning to make an audio contribution at a first one of said user devices after a period of silence in the audio communication session, providing a signal for at least one of said other user devices indicating that the first participant is beginning to make an audio contribution;

in response to receipt at said at least one other user device of a signal indicating that the first participant is beginning to make an audio contribution, triggering a predetermined audible indication for a respective participant at said at least one other user device indicating that said first participant is beginning to make an audio contribution.

The audio communication session would generally involve data indicative of received audio contributions being streamed digitally between user devices and reproduced as audio contributions at user devices for the respective participants, in order to allow them to hear the audio contributions made by other participants (and possibly by themselves as well).

According to some embodiments, the monitoring of audio contributions from a respective participant may be performed at the user device of said participant. In alternative embodiments, however, audio contributions from respective participants may be forwarded to a session control device such that the monitoring of audio contributions from the respective participants may be performed at the session control device.

According to preferred embodiments, the predetermined audible indication for a respective participant at said at least one other user device indicating that said first participant is beginning to make an audio contribution may be an audio representation of data previously stored at said at least one other user device. In such embodiments, the data previously stored at said at least one other user device may be a representation of a sound indicative of a participant beginning to make an audio contribution, and/or may be a representation of a sound indicative of said first participant beginning to make an audio contribution, and/or may be a representation of a sound previously received from said first participant at said first user device. Such data may be data determined in dependence on analysis of previously-received received audio contributions at said first user device.

According to preferred embodiments, the audio communication session may be managed by a session control device via which the user devices are configured to send said streamed data indicative of received audio contributions for forwarding to one or more other user devices. Such a session control device may comprise a communication bridge, conference controller or other such control device capable of perform audio and other such analysis of said streamed data, allowing comparison, arbitration and other more advanced functionality to be performed in respect thereof.

In such embodiments with a session control device, the session control device may be configured to identify, in response to respective detections that respective participants are beginning to make respective audio contributions after a period of silence in the audio communication session, which of said respective participants was the earlier or earliest to begin to make an audio contribution after the period of silence in the audio communication session, and thereby perform arbitration, determining which participant started talking first, or otherwise determining which participant's audio contributions are to be given priority.

Such a session control device may be configured to provide signals for at least one user device other than that of the participant who was the earlier or earliest to begin to make an audio contribution after the period of silence in the audio communication session that the participant who was the earlier or earliest to begin to make an audio contribution after the period of silence in the audio communication session is beginning to make an audio contribution. By virtue of this, "pre-emptive" sounds can be sent to participants other than the participant who started talking first, or to participants other than the participant to whom priority is to be given.

Such a session control device may be configured temporarily to suppress signals for the user device of the participant who was the earlier or earliest to begin to make an audio contribution after the period of silence in the audio communication session that any other participant is beginning to make an audio contribution and/or temporarily to suppress audio representations of audio contributions from any other participant from being provided for the participant who was the earlier or earliest to begin to make an audio contribution after the period of silence in the audio communication session. By suppressing such pre-emptive noises (and possibly actual speech from participants other than the first) from being relayed to the participant who started talking first, it can be ensured that such noises are not perceived as interruptions, and do not disturb the participant who started talking first.

According to preferred embodiments, the audio communication session may be managed by a session control device to which respective user devices are configured to send messages indicative of detections at said user devices that respective participants are beginning to make audio contributions after a period of silence in the audio communication session, and from which messages are provided for other user devices indicative respective participants having begun to make audio contributions. Such a session control device may be configured to determine which of a plurality of participants identified as beginning to make audio contributions after a period of silence in the audio communication session is to be prioritised, and is configured to provide messages for one or more other participants in dependence on such determinations. Such a session control device may be located with or associated with a session control device such as that discussed above, via which the user devices are configured to send said streamed data indicative of received audio contributions for forwarding to one or more other user devices.

According to a second aspect of the invention, there is provided apparatus for managing a streamed audio communication session between a plurality of user devices, the user devices being configured to send streamed data indicative of received audio contributions from respective participants in a multiple-participant audio communication session via a communications network to one or more other user devices for conversion to audio representations of said received audio contributions for one or more respective other participants; the apparatus comprising one or more processors operable to:

monitor audio contributions from respective participants, and in response to detection therefrom that a first participant is beginning to make an audio contribution at a first one of said user devices after a period of silence in the audio communication session, to provide a signal for at least one of said other user devices indicating that the first participant is beginning to make an audio contribution; and in response to receipt at said at least one other user device of a signal indicating that the first participant is beginning to make an audio contribution, to trigger a predetermined audible indication for a respective participant at said at least one other user device indicating that said first participant is beginning to make an audio contribution.

The various options and preferred embodiments referred to above in relation to the first aspect are also applicable in relation to the second aspect.

Preferred embodiments may incorporate small portions of sound such as pre-recorded or synthetic speech sounds, or phatic/filler speech sounds, into the audio stream to be played to participants, generally triggering the incorporation of such small portions of sound via a channel that is faster than that via which the main or "live" audio data is being conveyed, e.g. using a faster channel than the intermediary processing system, conference bridge and/or transmission channel used for the main or "live" audio data, such that the incorporated sounds pre-empt and are heard slightly in advance of the arrival and reproduction for listening participants of actual utterances by other (talking) participants. By virtue of this, the effective delay may essentially be concealed by such pre-emptive sounds. This is notably different from the prior techniques which aim simply to reduce delay, and may be of particular benefit in situations where it may not be possible or realistic to remove delay or reduce it further. Listeners may subtly be made aware that another talker has started talking, making them less likely to interrupt the talker by starting or continuing a new turn construction unit at the same time as the other talker. Overall, this may improve the quality of two-party communication sessions or multi-party conferences.

In embodiments with a session control device to which audio contributions from respective participants are forwarded, the session control device would generally identify periods of silence in the audio communication session, and hence detect instances of one or more participants beginning to make audio contributions after such periods of silence in the audio communication session as a part of the monitoring of audio contributions from the respective participants. It may use thresholds, filtering or other techniques to ensure that background noises do not interfere with determinations of periods of silence, essentially identifying as "periods of silence" periods during which no participants are making audio contributions. It may also use an appropriately set or adjustable length-of-time threshold to ensure that only periods of silence lasing longer than an appropriate length of time are identified as periods of silence.

In embodiments without a session control device, periods of silence in the audio communication session may be identified by one or more of the respective user devices.

Preferred embodiments may arbitrate between the starts of respective participants' attempted audio contributions, determining (at times when there is potential "double-talk") which talker was the "first talker" after a period of silence and immediately triggering a pre-emptive sound to be heard at each other participant's terminal indicative of the "first talker" starting to talk, while also preventing that first talker from hearing any pre-emptive sounds indicative of any other participants starting to talk (thereby encouraging the first talker to continue talking).

With preferred embodiments, there may in effect be two stages or functions each of which may assist in stopping other participants from interrupting the first to break a silence, as follows:

(i) the playing of the predetermined audio indications to the other participants (whose identities may in preferred embodiments be determined in dependence on the identification of which of the participants was the first to break a silence), this being done with the aim of making any of those other participants less likely to continue with contributions they had just begun to make; and (ii) suppressing the reproduction of those other participants' attempted contributions so reproductions thereof at the first speaker's user terminal are prevented and therefore don't actually interrupt the first speaker, who may therefore feel free to continue to speak, unaware of any attempted (but unintentional) interruption(s).

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to the accompanying figures, methods and apparatus according to preferred embodiments will be described.

As mentioned earlier, FIG. 1 illustrates a basic conversational turn-taking procedure. At stage s1, a Turn Construction Unit (TCU) of a participant is in progress. This TCU may come to an end by virtue of the current participant/talker stopping talking having explicitly selected the next talker (stage s2), in which case the procedure returns to stage s1 for a TCU of the selected next talker. If the current talker doesn't select the next talker, another participant may self-select (stage s3), with the procedure then returning to stage s1 for a TCU of the self-selected next talker. If no other participant self-selects at stage s3, the current talker may continue with the procedure returning to stage s1 for another TCU from the same talker. If the current talker doesn't continue, the procedure returns from stage s4 to stage s3 until another talker does self-select. Essentially, the next talker is determined by the next participant to start talking.

As discussed above, in particular with reference to FIG. 2, delay may affect the turn-taking process. The participants themselves may not be aware of such delays (network delays, processing delays or other delays), or be aware that the normal running of the conversation may be being affected by such delays—they may in fact believe that other participants are being impolite (as interruptions in a face-to-face discussion or in a live discussion unaffected by such delays may be considered impolite) or genuinely slow to respond.

It should be noted that the following description of preferred embodiments will relate primarily to issues caused by delay, which can have such impacts on audio communication sessions. Audio communication sessions may also be affected by other issues such as echo, which may be caused by a "far end" acoustic terminal or any intermediate point in the transmission, and which can have a severe impact on conversation. Techniques exist to control it, and may be used together with the techniques described below.

As indicated earlier, while a two-party communication session may happen simply between the two parties involved, with encoded data indicative of respective audio contributions being routed directly (generally bi-directionally) between the parties via a communications network, multi-party communication sessions generally happen via a "conference bridge", with data indicative of respective audio contributions being routed (again, generally bi-directionally) between each party and a conference bridge via a communications network, such that the conference bridge acts as a "hub" and possibly a control entity for the communication session. A conference bridge may of course be used for a two-party communication session, and a multi-party communication session may take place without a bridge (although this may require complex co-ordination).

Before discussing the specific functionality of preferred embodiments concerned with mitigating problems caused by delay, a brief explanation will be provided of a possible conference system including a conference server or bridge. It will be noted however that embodiments of the invention are applicable both in relation to communication systems and sessions involving a conference bridge (e.g. multi-party communication sessions) as well as to communication systems and sessions that do not involve the use of a conference bridge (e.g. simple two-party communication sessions).

Figure 3:
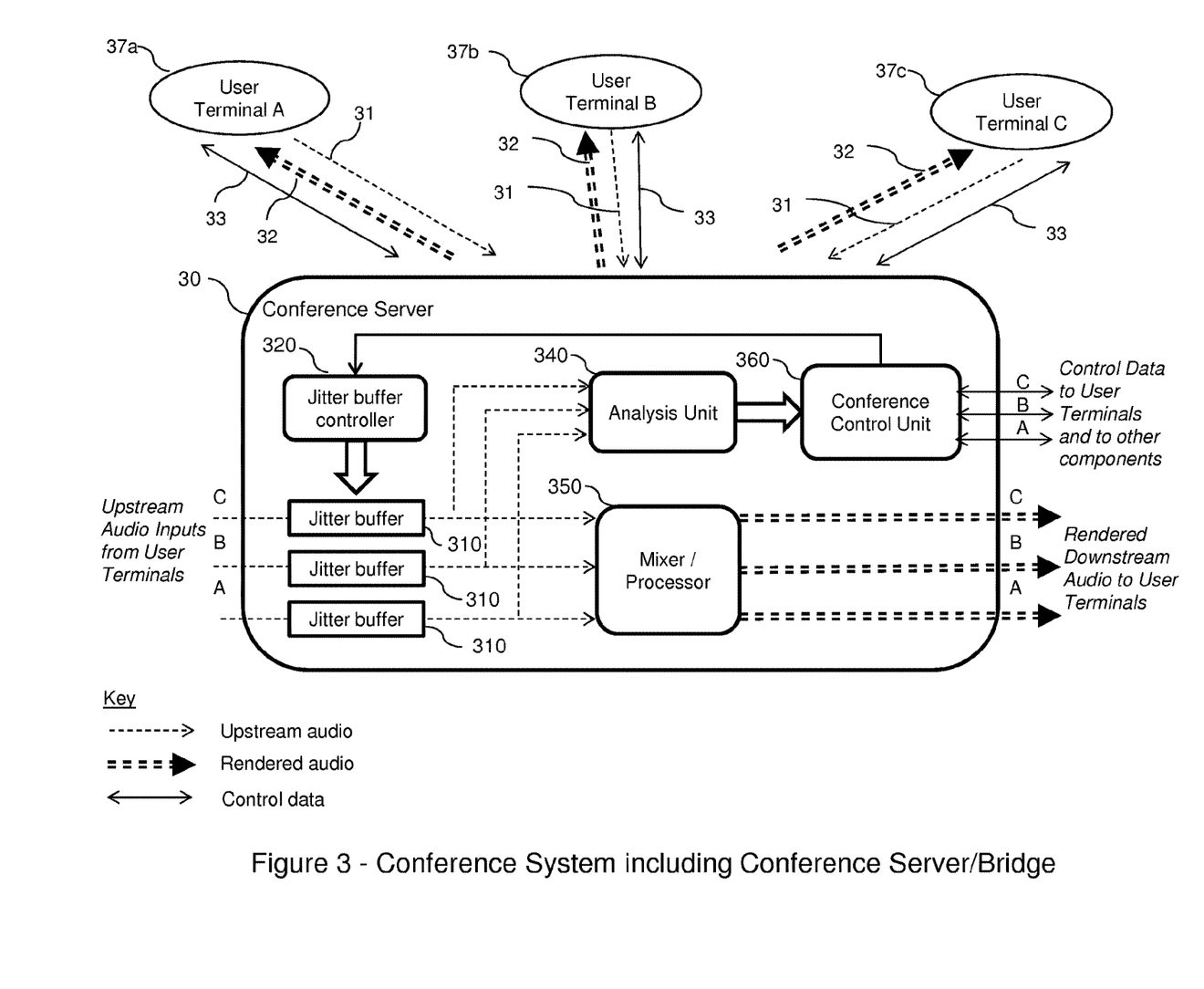
FIG. 3 shows a conference system including a conference server or bridge.

A conference system involving a conference server or bridge is shown in FIG. 3. A plurality of user terminals 37a, 37b, 37c are connected to a centralised conference server 30 via bi-directional data links that carry a combination of single-channel (generally upstream) audio data 31, multi-channel (generally downstream) audio data 32, and additional (generally bi-directional) digital control and/or reporting data 33. The data links could consist of a number of tandem links using a range of different transmission technologies and possibly include additional processing such as encryption, secure pipes and variable length data buffering. The actual individual links and routes (i.e. the precise network routers) by which the data proceeds between the conference server 30 and the respective user terminals 37 need not be fixed—they could be changed even during a communication session to links suffering a lower delay, experiencing lower congestion or incurring a lower cost, for example.

Single-line dotted arrows 31 represent single-channel upstream audio data carrying audio contributions of individual conference participants being transmitted/streamed from respective user terminals 37 to (and within) the conference server 30. Double-line dotted arrows 32 represent multi-channel/rendered downstream audio data resulting from the processing and combining at the conference server 30 of audio contributions of multiple conference participants, which is transmitted/streamed from the conference server 30 to the respective user terminals 37. Unbroken arrows 33 represent digital control and/or reporting data travelling between the conference participants 37 the conference server 30. It will be understood that the paths for the respective types of data 31, 32, 33 may be via the same or different servers, routers or other network nodes (not shown).

Referring to the conference server 30, which could be used or configured for use in performing a method according to a preferred embodiment, upstream audio inputs from conference clients (received from their respective user terminals 37) may be passed through jitter buffers 310 before being passed to an Analysis Unit 340 and on to a Conference Control Unit 360, and to a Mixer/Processor 350. The jitter buffers 310 may be used to prevent data packets being discarded if they suffer excessive delay as they pass through the data link. The length of each jitter buffer may be determined by a jitter buffer controller 320 using an optimisation process which takes into account the measured jitter on the data packets and the packet loss rate, for example.

The mixer/processor 350 receives the upstream audio data from the conference terminals 37 (via jitter buffers 310 where these are present), performs signal processing to combine and render the audio signals and distributes the mixed/rendered signal back to the conference terminals 37. The analysis unit 340 takes the upstream audio data, extracts delay and other performance indicators, and passes them to the conference control unit 360.

The conference control unit 360 may be a processor or processor module configured to implement a set of controls to other system components (e.g. providing instructions to server(s), routers etc. and/or providing instructions to be implemented on the conference server 30 itself or on the individual conference terminals 37 relating to adjustments to audio parameters, for example) based on system-specific rules applied to data such as speech-quality, transmission delay data and other timing data with a view to mitigating adverse effects, and to improving user experience and perception. It may comprise processing modules and memories for processing and storing information in respect of paths to respective conference terminals, information relating to respective user terminals, etc., and may send control data to the jitter buffer controller 320 and to external system components such as user terminals 37, server(s) and/or routers on paths thereto and therefrom, etc.

As indicated earlier, delay can be caused by a number of factors, such as the following:

Fundamental transmission delay due to the distance between talkers inherent in a network and any transmission system.

The transmission system may itself perform buffering either as part of the processing or to allow for varying inter-arrival delay of packets in a packet based transmission system.

Audio mixing in a conference bridge where one is used (i.e. one is generally used in the context of a multi-party communication session) can add delay due to processing such as noise reduction, level control, equalisation etc.

Audio mixing in a conference bridge may also include filtering such as spatial audio processing and artificial room rendering which can add considerable delay.

Techniques to reduce the impact of packet loss such as forward error correction and retransmission.

In order to illustrate the specific functionality of preferred embodiments concerned with mitigating problems caused by delay, an embodiment will first be explained in the context of a simple two-party communication session that does not involve the use of a conference server or bridge. In such embodiments that do not involve a conference bridge, additional functionality may need to be performed by the respective user terminals, as will be explained. After the explanation of the two-party embodiment that does not make use of a conference bridge, an explanation will be provided of how an embodiment may be implemented in the context of a multi-party communication session that does make use of a conference server or bridge (and which thereby enables additional functionality to be performed therein and/or in an associated module that will be referred to as a "messaging bridge".

Figure 4:
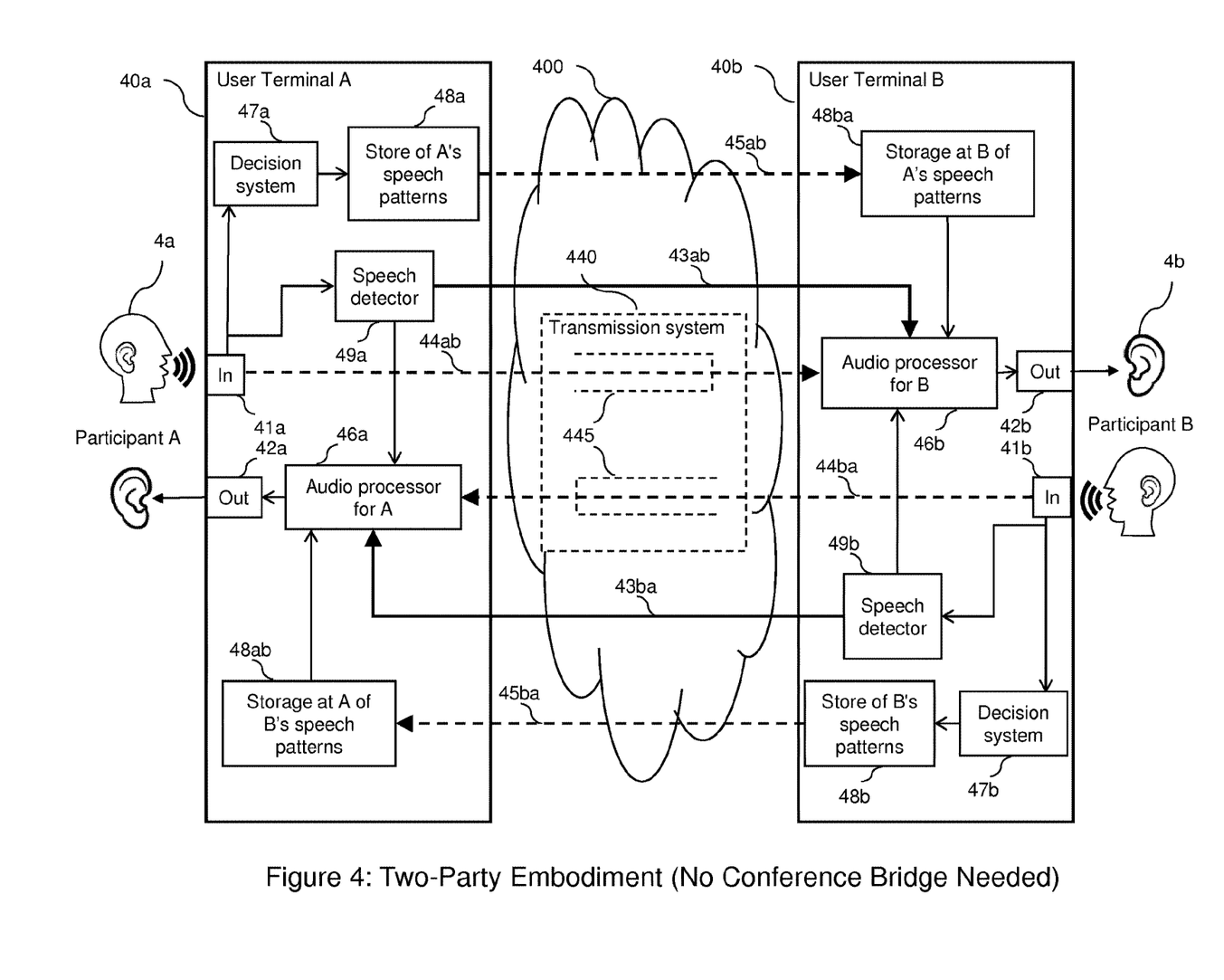
FIG. 4 illustrates the entities and interactions involved in a two-way, two-party audio communication session performed according to an embodiment without a conference server or bridge.

With reference to FIG. 4, this illustrates the entities and interactions involved in a symmetrical two-way, two-party audio communication session performed according to an embodiment without a conference server or bridge, and relates to a scenario in which two participants or parties A, 4a and B, 4b are involved as speakers and as listeners in the communication session. Participant A, 4a uses user terminal A, 40a, providing audio contributions (i.e. speaking) into a microphone or other audio input interface 41a so these can be encoded then transmitted via a communications network 400 to other parties such as Participant B, 4b, and receiving audio contributions (i.e. listening) via a speaker, headset or other audio output interface 42a which have been decoded following transmission via the communications network 400 from other parties such as Participant B, 4b. Similarly, Participant B, 4b uses user terminal B, 40b, providing audio contributions into audio input interface 41b so these can be encoded then transmitted via communications network 400 to other parties such as Participant A, 4a, and receiving audio contributions via audio output interface 42b which have been decoded following transmission via the communications network 400 from other parties such as Participant A, 4a.

As indicated earlier, while the transmission via the network 400 may be via an entity such as a conference bridge, for simplicity, it will simply be shown here as passing directly through the network 400 between the parties concerned. To illustrate how delay may be introduced, the present embodiment will regard the route through network 400 as simply passing through a generic transmission system 440. As well as transmission delay, this may cause delay due to buffering and/or processing in buffering and/or processing modules 445.

Note that of the possible causes of delay given above, generally, the most significant delays are mostly due to audio processing and buffering of audio data. On account of this, it will generally be possible to transmit control and status data between the user terminals in question significantly more quickly than it is generally possible to transmit audio data between them. This is significant, because if any remote terminals can be made aware in advance that another person has started talking, the output of respective audio processors 46a, 46b (respectively providing audio outputs for Participants A and B) at each of those remote terminals 40a, 40b can be modified by adding pre-recorded speech elements or other "pre-emptive sounds" prior to the start of the reproduction by the remote terminal 40 in question of the actual utterance from the talker 4 in question. Such pre-emptive sounds will discourage any such remote participants from starting to talk before the actual, "near-live" audio data from the talker in question arrives at the remote terminal in question.

A benefit of preferred embodiments therefore is that listeners will hear what will sound like the start of a remote talker's speech (or other such "pre-emptive sounds") earlier than they would using existing mechanisms. Consequently, the disturbing effect of talkers "talking over each other" may be reduced to a level comparable with natural conversation (i.e. without delays caused by buffering/processing 445 in the transmission path or by the transmission system 440 in general). Another way of looking at this is that such embodiments allow a smoother transition from a 'nobody talking' state to a 'one person talking' state, avoiding or mitigating against disruptive situations such as those shown in FIG. 2.

As will be explained later, preferred embodiments, in particular such as those which make use of a control entity, may also allow for automated arbitration to be performed, with an almost-immediate determination being made at the control entity as to which participant was actually the first to start talking after a 'nobody talking' state, then messages being sent from the control entity causing each other party to hear a pre-emptive sound indicative of that "first talker" starting to talk prior to the start of the reproduction of the actual utterance from the first talker. Further, the control entity may temporarily suppress the reproduction of those other participants' utterances (or may send messages instructing the user terminals to suppress such reproduction temporarily) in particular at the terminal of the "first talker", in order not to cause that first talker to stop talking unnecessarily.

Referring again to FIG. 4, each user terminal 40 (i.e. 40a and 40b) contains the following components in addition to the audio input 41 and output 42 interfaces discussed above:

An audio processor 46 (i.e. audio processor 46a in User Terminal A, 40a, and audio processor 46b in User Terminal B, 40b). Each of these is in the received audio path in question, and contains appropriate processing to include in the audio data to be played to the local listener in question pre-emptive sounds indicative of the other (i.e. remote) party starting to make an audio contribution, thereby concealing the presence of the delay between that remote party actually having started to make an audio contribution and the audio data for that audio contribution actually arriving at the listener's terminal. In practice the audio processors 46 are likely to be combined with existing receiver processors and buffers so that no additional delay is caused.

A decision system 47 (i.e. 47a and 47b) that detects certain phatic or filler speech sounds such as 'Umm', 'Err' etc.

At least one memory or store 48 (i.e. 48a and 48b, 48ab and 48ba) for storing audio data such as speech patterns of the respective participants;

A speech detector 49 (i.e. 49a and 49b) which detects when the local user is talking.

As well as various internal interactions and communication links within the respective user terminals 40, FIG. 4 also shows three types of communication between the user terminals:

(i) in-session audio data communication (with dotted lines 44ab and 44ba representing the generally-subject-to-delay transmission of encoded audio data from the audio input interface 41 of one participant to the audio processor 46 of the other participant, via the network 400) via which encoded audio traffic passes, possibly via an audio bridge, audio processing, buffering etc.;

(ii) pre-session audio data communication of stored audio data (with dotted lines 45ab and 45ba representing the transmission (again via the network 400) of stored audio data from a speech pattern store 48 (i.e. 48a and 48b) at one participant's user terminal of that participant's own speech patterns to a speech pattern store 48 (i.e. 48ab and 48ba) at the other participant's user terminal of the other participant's speech patterns, this being done in advance of such data being needed at the receiving terminal during a communication session; and (iii) in-session direct message (i.e. non-audio) communication (with unbroken arrows 43ab and 43ba representing the generally almost-instantaneous transmission of message data from the speech detector 49 of one participant to the audio processor 46 of the other participant, again via the network 400) that enables small amounts of control and information data to be exchanged rapidly, without encountering the type of delays encountered by audio data (i.e. due to audio processing, buffering etc.).

In relation to these types of communication, it will be appreciated that while (i) and (iii) happen as part of an in-progress, real-time communication session, but need not involve the same path through the network, (ii) would generally not need to be done during a communication session, and would generally be completed prior to the actual communication session. Again, it need not involve the same path through the network as (i) or (iii).

Looking now at the various memories 48 for the storage of audio data such as speech patterns, there may just be a single memory in each terminal 40, or the data may even be stored remote from the terminals, but the memories are represented in FIG. 4 as two different stores within each terminal, to illustrate the different purposes for which storage is used, as follows:

In user terminal A, 40*a*, there is a "local talker" speech pattern store 48*a* for a range of speech patterns such as phatic/filler expressions from the local talker, Participant A, 4*a*, and there is also a "remote talker" speech pattern store 48*ab* for a range of speech patterns such as phatic/filler expressions from the remote talker, Participant B, 4*b*.

In user terminal B, 40*b*, there is "local talker" speech pattern store 48*b* for a range of speech patterns such as phatic/filler expressions from the local talker, who in this case is Participant B, 4*b*, and there is also a "remote talker" speech pattern store 48*ba* for a range of speech patterns such as phatic/filler expressions from the remote talker, who in this case is Participant A, 4*a*.

Data may be exchanged between the above modules as shown by the broken arrows 45*ab* and 45*ba*. Thus, copies of A's speech patterns, locally-stored at A's own terminal 40*a* in store 48*a*, may be provided to B via link 45*ab* and stored in B's store of A's speech patterns 48*ba*. Similarly, copies of B's speech patterns, locally-stored at B's own terminal 40*b* in store 48*b*, may be provided to A via link 45*ba* and stored in A's store of B's speech patterns 48*ab*.

The respective decision systems 47 (i.e. 47*a* and 47*b*) may learn about their respective local talker's speech patterns, including typical sounds made as they begin talking. These are often quite short and may include noises such as breathing sounds or short noises that constitute the start of speech ("Ummm . . . ", "Errr . . . ", etc.). The decision systems 47 may use any suitable pattern recognition method, for example a neural network could be trained using offline speech patterns tagged by an expert user. The decision systems 47 could be static (e.g. a trained neural net) or could train themselves over the course of use (e.g. reinforced learning). They capture the sounds and place these in the local speech pattern stores 48*a*, 48*b* of the local user. The sounds could be stored in any number of ways e.g. as waveforms, parametric speech codes or a combination of both.

Once there is a database of the local user's sounds in a local user store 48*a*, 48*b*, or as they are added, the sounds (waveforms or parametric speech codes) may be transmitted to the remote stores 48*ab*, 48*ba* at other user's terminals as set out above. Ideally, the stores 48*a*, 48*b* of each participant's own sounds are populated before the start of the communication session and are transmitted to the respective "remote talker" stores 48*ab*, 48*ba* at or before call set-up time, but the databases could be built up from the start of the communication session and sent during the communication to update mirrored databases at remote stores 48*ab*, 48*ba*

Each sound in each "local talker" store 48*a*, 48*b* may be indexed (unique for each sound and each talker) and this index may be transmitted with the sounds to remote store 48*ab*, 48*ba* such that it too can access the database using the same key used at local store 48*a*, 48*b*.

During the communication, if the online detector 49*a* of user terminal A, 40*a*, detects a portion of speech that is the start of a turn constructional unit (or turn transition point) of its local user 4*a*, it determines the sound that most closely matches it in local store 48*a* and sends the index of this sound to the local audio processor 46*a*. The audio processor 46*a* uses the transmitted index to recall the sound stored in store 48*ba* and sends this index to the audio channel of the recipient, participant B, 4*b*. By mixing this sound from store 48*ba* into the stream for the transmitted audio (which will be received slightly later from participant A, 4*a*) the recipient 4*b* can hear the required sound (or a sound similar to it) before it has actually been transmitted through the network 400 (i.e. via the transmission system 440 and/or intermediary processing unit 445). The audio processor 46*b* may need to mix the pre-emptive (delay concealment) sound from store 48*ba* carefully with the actual sound transmission once this is received from the network 400, for example using a trailing window at the end of the sound from store 48*ba*. This process could be aided by data from the local speech detector 49*b*.

By virtue of the above, if A starts to talk (or makes a sound indicating that they are about to talk) slightly before B, a message will be sent from A's speech detector 49*a* to B's audio processor 46*b*, triggering B's audio processor to incorporate a pre-emptive sound previously transferred from A's store 48*a* to B's store 48*ba* into the stream to be played to B. (At the same time, A's speech detector 49*a* may also signal to A's own audio processor 46*a* that any message received shortly afterwards from B's speech detector 49*b* should be ignored, in order to prevent a corresponding pre-emptive sound previously transferred from B's store 48*b* to A's store 48*ab* from being incorporated into the stream to be played to A.)

Looking now at how this may be implemented in relation to a multi-party scenario, this may involve each party interacting via a user terminal such as the User Terminals 40 shown in FIG. 4, with bi-directional messaging links between the respective parties/user terminals. Each "remote talker" store would preferably have a set of pre-emptive sounds from each other participating talker, an appropriate one of which would be incorporated into the local audio stream on receipt of a message from whichever other participant had started talking.

Figure 5:
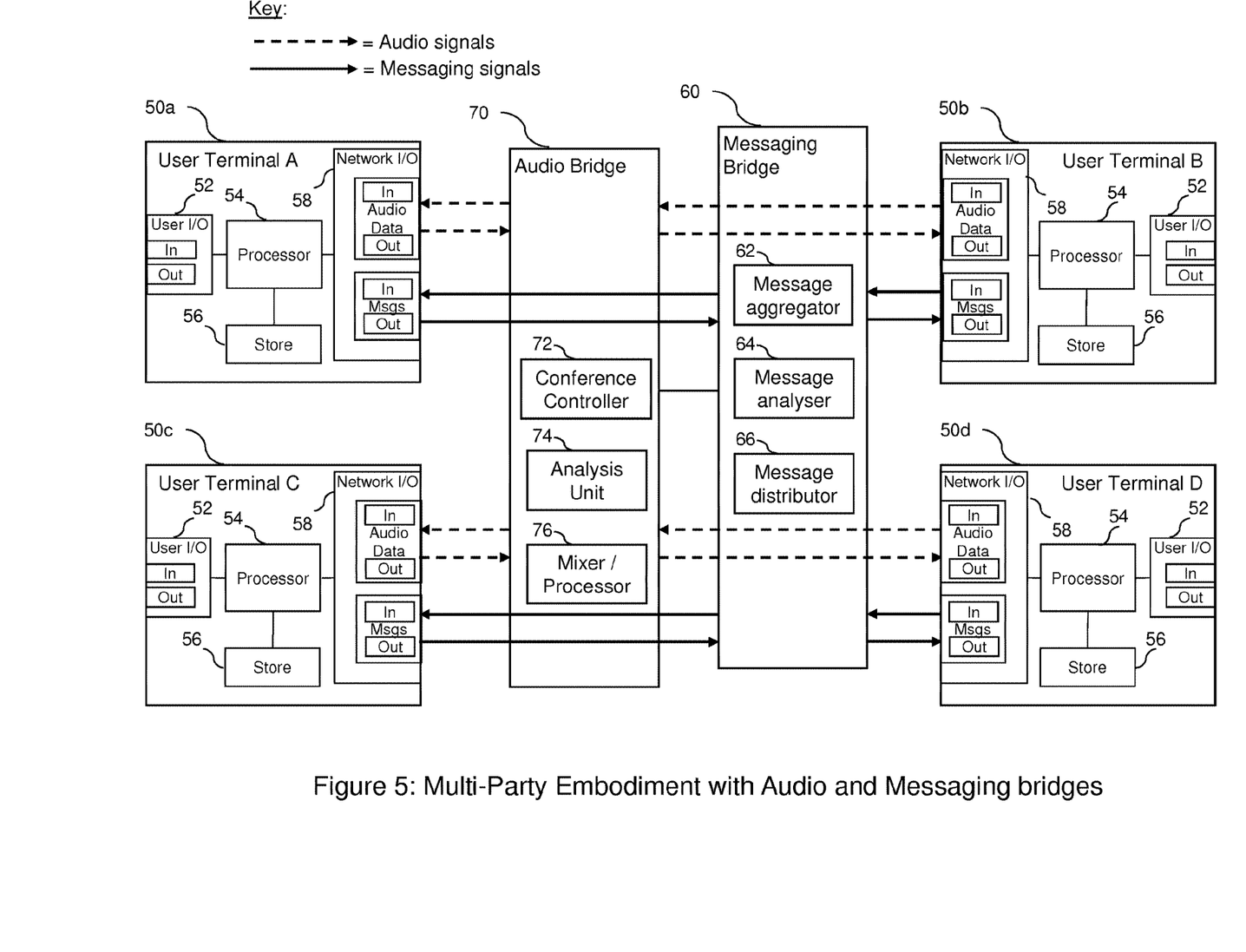
FIG. 5 illustrates the entities and interactions involved in a multi-party audio communication session performed according to an embodiment with an audio bridge and a messaging bridge.
Figure 6:
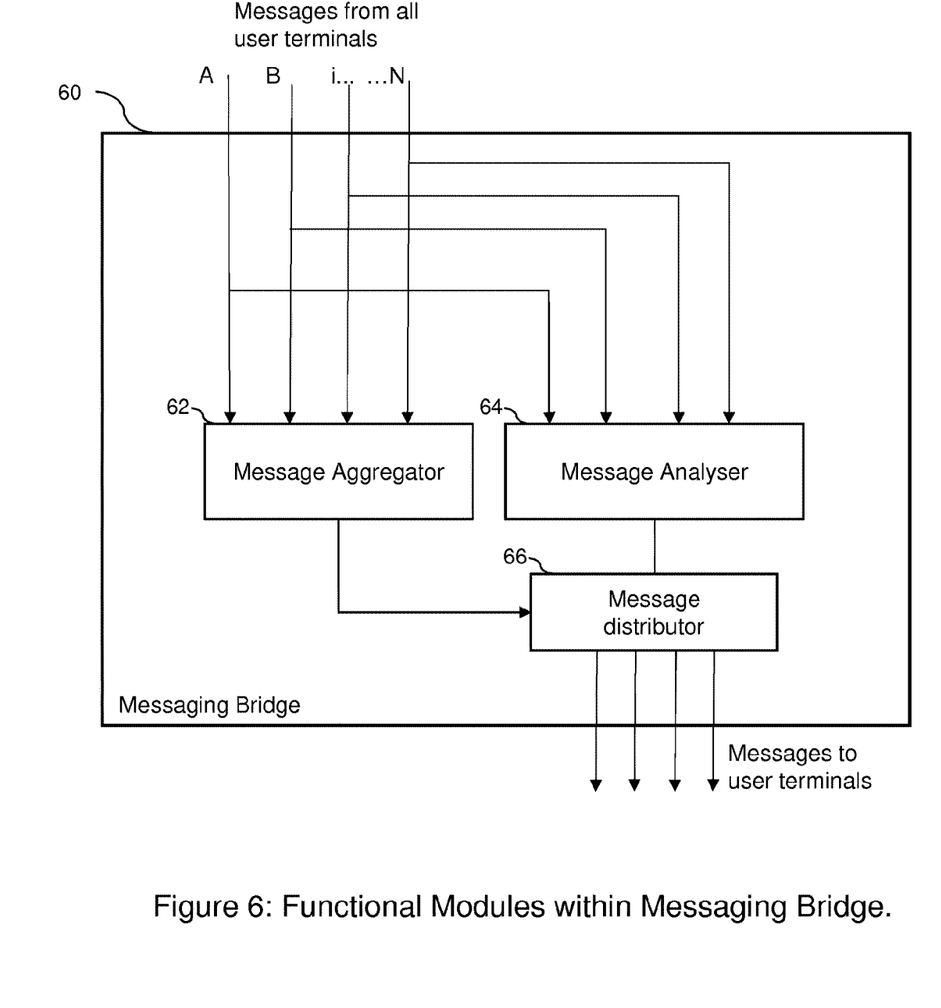
FIG. 6 illustrates functional modules that may be present within a messaging bridge.

In relation to such a multi-party scenario, and in particular one based on a system such as that described with reference to FIG. 3, in which a communication session is handled via an audio bridge via which audio signals are passed and processed between the respective participants, it may be more effective for the conference system to be adapted to have a bridge for the messaging/data paths as well as the bridge for the audio data, or one bridge performing both functions (i.e. processing/distributing messaging data/signals from each participant as well as audio data/signals from each participant). An example of this is shown in FIG. 5. In this scenario the messaging bridge 60 could include components allowing further centralised analysis of speech traffic in order to provide additional data to the User Terminals 50. The interactions that may take place between these components and the user terminals are illustrated in FIG. 6, which will be discussed later.

Referring to FIG. 5, this illustrates the entities and interactions involved in a multi-party audio communication session performed according to an embodiment with an audio bridge 70 and a messaging bridge 60, and relates to a scenario in which four participants or parties may be involved as speakers and as listeners via respective user terminals 50 (i.e. User Terminals A (50a), B (50b), C (50c) and D (50d)).

Briefly leaving aside the interactions of the user terminals 50 and the audio bridge 70 of FIG. 5 with the messaging bridge 60, and the respective functions specifically associated with those interactions, the user terminals 50 and audio bridge 70 may generally perform functions similar to those of the user terminals 37 and conference server 30 in the conference system of FIG. 3, so their normal functions will not be described again in detail. They will be summarised, but the following explanation will otherwise concentrate on the specific functionality of these components when performing a method according to a preferred embodiment.

Each user terminal 50 has a user interface 52 for audio input and output from/to a user (e.g. a headset comprising a microphone and a speaker, for example) and a network interface 58, which allows for input and output of encoded audio data, which is exchanged via a network connection between the respective user terminals 50 and the audio bridge 70, and for input and output of messaging data, which is exchanged via a network connection between the respective user terminals 50 and the messaging bridge 60.

Each user terminal 50 also has a processor 54 and a store 56. The processor 54 is shown as a single module in order to avoid over-complicating the diagram, but may perform functions equivalent to at least some of the functions of the audio processors 46, the decision systems 47 and the speech detectors 49 in the user terminals 40 shown in FIG. 4, with others (or their equivalents) being performed by components of the messaging bridge 60 or the audio bridge 70. Similarly, the store 56 is shown as a single module in order to simplify the diagram, but may perform functions equivalent to some or all of the functions of the speech pattern stores 48 in the user terminals 40 shown in FIG. 4 (although again, some of these (or their equivalents) may instead be performed by components of the messaging bridge 60 or the audio bridge 70). Primarily, however, each store 56 may store audio data such as speech patterns and/or other pre-emptive noises of the respective participants, some being those of the local participant (in order that these can be sent via a network connection, possibly via the audio bridge 70, to other participants, and some being those of other participants (having been received from those other participants via a network connection, possibly via the audio bridge 70, for use by the terminal of the local participant). It will be noted that the audio data for the respective participants may be collected and stored centrally, in a store in the audio bridge 70, for example, and incorporated into the respective rendered audio streams as appropriate and forwarded on to the respective participants.

Each processor 54 receives audio contributions of the local participant and encodes these for transmission via a network connection and via the audio bridge 70 to the other participants. Each processor 54 also receives encoded audio contributions transmitted from other participants via a network connection and via the audio bridge 70 and decodes these for audio reproduction to the local participant. Further, each processor 54 analyses audio contributions of the local participant in order to identify the start of new utterances, in response to which it causes messages to be sent via a network connection to the messaging bridge 70, causing this to forward resulting messages to the other participants. Further, each processor 54 receives messages received from the messaging bridge 70 indicative of other participants having started to make new utterances, and incorporates into the audio output for the local participant appropriate pre-emptive noises indicative of other participants having started to make new utterances.

The audio bridge 70 and messaging bridge 60 are shown in FIG. 5 as being separate modules. It will be appreciated that they are shown this way primarily in order to make the following explanation of their respective functions clearer. While they may be separate, functionally and in terms of location, they may in fact be co-located, or form parts of one combined bridge module performing the functions of both bridges (i.e. processing/distributing messaging data/signals from each participant as well as audio data/signals from each participant). Such a combined bridge may also perform other conference control functions such as that performed by conference server 30 in the conference system of FIG. 3. Additionally, there exists a range of possible hybrid embodiments between those shown in FIGS. 4 and 5, in which various parts of the processing may be performed in different places or by different entities (e.g. in one or other of the bridges, where these are used, in the user terminals, or elsewhere in the network). Messages may be passed through one or other of the bridges, or may take a route avoiding passing through either of the bridges.

Referring specifically to the audio bridge 70, this is shown as having a Conference Controller 72 (which may perform functions corresponding to those of the Conference Control Unit 360 in the Conference Server 30 of FIG. 3), an Analysis Unit 74 (which may perform functions corresponding to those of the Analysis Unit 340 in the Conference Server 30 of FIG. 3), and a Mixer/Processor 76 (which may perform functions corresponding to those of the Mixer/Processor 350 in the Conference Server 30 of FIG. 3). It also has audio interfaces (not shown in order to avoid making the diagram over-complex) via which it receives individual encoded audio contributions from the respective user terminals and via which it provides rendered downstream audio to the respective user terminals. The received and downstream audio signals are symbolised by the broken arrows between the user terminals 50 and the audio bridge 70.

In addition to the functions referred to above, the Conference Controller 72 of the audio bridge 70 is in communication with the messaging bridge 60, allowing it to receive instructions from the messaging bridge 60.

Referring specifically to the messaging bridge 60, this is shown as having a message aggregator 62 which receives the messaging signals (symbolised by unbroken arrows) from the user terminals 50, a message analyser 64 which analyses those messages in order to determine, for example, which participant started talking first in situations where two or more participants have started talking at times very close to one another, and/or perform other such arbitration between the participants and/or their respective audio contributions, and a message distributor 66 which sends messaging signals to the user terminals 50 in dependence on the outcome of the analysis by the message analyser 64. While the messaging signals from the messaging bridge 60 could simply be sent directly to the respective user terminals 50, instructing respective user terminals to include pre-emptive sounds in the respective audio playbacks to participants other than the "first talker", in this example, they are also provided to the audio bridge, allowing this to adjust the rendered audio streams being provided to the respective user terminals 50 as well.

The messaging bridge 60 may thus interact with audio bridge 70, allowing this to suppress actual audio contributions (temporarily, at least) from participants other than the "first talker", as well as performing the function of determining which messaging signals to send to which user terminals in order to trigger the playing of pre-emptive sounds to participants other than the "first talker".

It will be appreciated that the audio bridge 70 and/or messaging bridge 60 may be configured to implement policies other than the "priority to first talker" policy explained above, either in addition to or as well as the "priority to first talker" policy. An example of another such policy may be a "priority to a meeting's chairperson" policy, according to which the beginning of an utterance by a designated chairperson may result in pre-emptive sounds indicative of the chairperson being played to each other participant, and/or audio contributions from those other participants temporarily being suppressed, even if the chairperson was not actually the "first talker". Other possible "priority" policies may also be implemented in addition to or instead of the above.

Referring to FIG. 6, this illustrates in more detail than FIG. 5 the functional modules that may be present within the messaging bridge 60, in particular illustrating that messages from each of the user terminals 50 may be received by the message aggregator 62 in order that these may be combined and forwarded on to each of the user terminals 50, and may also be passed to the message analyser 64 for analysis (e.g. for arbitration as to which participant was the first to start an utterance). The combined messages from the message aggregator 62 and the results of the analysis by the message analyser 64 may both be passed to the message distributor 66 for distribution to the respective user terminals 50.

OTHER EMBODIMENTS AND OPTIONS

While the decision systems 47 in FIG. 4 may learn purely from their local talker, they (and/or their counterpart decision-making modules in the processors 54 or associated components of the messaging bridge 60 or audio bridge 70 in FIG. 5) may learn from one or more other sources, from interactions with and/or between other talkers, for example.

The speech stores 48 in FIG. 4 (and/or their counterpart stores in FIG. 5) may be built up from examples of the respective local and remote talker's speech, but they could initially contain a number of standard sounds (e.g. breathing noise, throat-clearances, lip smacks, etc.) that could be used before a particular talker's patterns are learned and stored.

While the decision systems 47, speech pattern stores 48 and speech detectors 49 are shown as being located at the respective user terminals 40 in FIG. 4, they may be located at an intermediary system, or at one particular user terminal. The location should be chosen such that the delay in decision-making and exchanging messages is minimised.

The embodiments described above refer to audio channels of a communication session, but visual cues could also be provided to video-capable user terminals where appropriate. These could involve simple lights or symbols indicating that a talker has started talking or could involve more complex cues, such as on-screen changes to the visual image of a talker (e.g. changes to start moving the lips in a pattern that matches a chosen pre-emptive sound, possibly from a visual database learned from the talker in question). Similarly, visual cues may also be used to determine when participants begin to make contributions. If participant A joins an audio-visual conference, but participant B joins but for audio only, the system could detect that participant A is about to speak from a visual cue (e.g. opening mouth, sitting up, raising a finger) and send a message to participant B that participant A is about to speak.

Pre-emptive sounds could be used for every utterance after a period of silence, for every instance of potentially-conflicting utterances, or for other types of situation. They could be used such that the pre-emptive sounds are only used when the amount of delay or the length of the period of silence being broken is above a certain threshold, for example.

Processing such as that which may be implemented on actual speech signals in an audio bridge 70 (e.g. spatialized audio processing) may also be used on sounds such as those stored in the stores 48. Such processing would preferably be performed in advance of a communication session, but it may be done dynamically, during a communication session.

Figure 7:
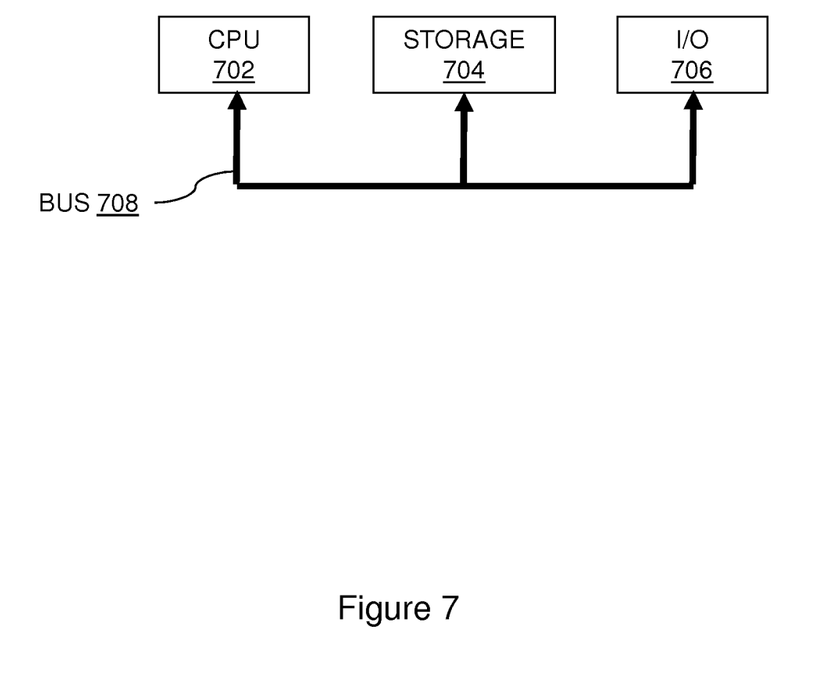
FIG. 7 is a block diagram of a computer system suitable for the operation of embodiments of the present invention.

FIG. 7 is a block diagram of a computer system suitable for the operation of embodiments of the present invention. A central processor unit (CPU) 702 is communicatively connected to a data store 704 and an input/output (I/O) interface 706 via a data bus 708. The data store 704 can be any read/write storage device or combination of devices such as a random access memory (RAM) or a non-volatile storage device, and can be used for storing executable and/or non-executable data. Examples of non-volatile storage devices include disk or tape storage devices. The I/O interface 706 is an interface to devices for the input or output of data, or for both input and output of data. Examples of I/O devices connectable to I/O interface 706 include a keyboard, a mouse, a display (such as a monitor) and a network connection.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the invention may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of managing a streamed audio communication session between a plurality of user devices, the user devices being configured to send streamed data indicative of received audio contributions from respective participants in a multiple-participant audio communication session via a communications network to one or more other user devices for conversion to audio representations of said received audio contributions for one or more respective other participants; the method comprising:
    monitoring audio contributions from respective participants, and in response to detection therefrom that a first participant is beginning to make an audio contribution at a first one of said user devices after a period of silence in the audio communication session, providing a signal for at least one of said other user devices indicating that the first participant is beginning to make an audio contribution;
    in response to receipt at said at least one other user device of a signal indicating that the first participant is beginning to make an audio contribution, triggering a predetermined audible indication for a respective participant at said at least one other user device indicating that said first participant is beginning to make an audio contribution;
    wherein the predetermined audible indication for a respective participant at the at least one other user device indicating that said first participant is beginning to make an audio contribution is an audio representation of data previously stored at said at least one other user device, the data previously stored at said at least one other user device being a representation of a sound previously received from said first participant at said first user device and/or data determined in dependence on analysis of previously-received received audio contributions at said first user device.

2. A method according to claim 1 wherein the monitoring of audio contributions from a respective participant is performed at the user device of said participant.

3. A method according to claim 1 wherein the data previously stored at said at least one other user device is a representation of a sound indicative of a participant beginning to make an audio contribution.

4. A method according to claim 1 wherein the data previously stored at said at least one other user device is a representation of a sound indicative of said first participant beginning to make an audio contribution.

5. A method according to claim 1 wherein the audio communication session is managed by a session control device via which the user devices are configured to send said streamed data indicative of received audio contributions for forwarding to one or more other user devices.

6. A method according to claim 5 wherein the session control device is configured to identify, in response to respective detections that respective participants are beginning to make respective audio contributions after a period of silence in the audio communication session, which of said respective participants was the earlier or earliest to begin to make an audio contribution after the period of silence in the audio communication session.

7. A method according to claim 6 wherein the session control device is configured to provide signals for at least one user device other than that of the participant who was the earlier or earliest to begin to make an audio contribution after the period of silence in the audio communication session that the participant who was the earlier or earliest to begin to make an audio contribution after the period of silence in the audio communication session is beginning to make an audio contribution.

8. A method according to claim 6 wherein the session control device is configured temporarily to suppress signals for the user device of the participant who was the earlier or earliest to begin to make an audio contribution after the period of silence in the audio communication session that any other participant is beginning to make an audio contribution and/or temporarily to suppress audio representations of audio contributions from any other participant from being provided for the participant who was the earlier or earliest to begin to make an audio contribution after the period of silence in the audio communication session.

9. A method according to claim 1 wherein the audio communication session is managed by a session control device to which respective user devices are configured to send messages indicative of detections at said user devices that respective participants are beginning to make audio contributions after a period of silence in the audio communication session, and from which messages are provided for other user devices indicative respective participants having begun to make audio contributions.

10. A method according to claim 9 wherein the session control device to which respective user devices are configured to send messages is configured to determine which of a plurality of participants identified as beginning to make audio contributions after a period of silence in the audio communication session is to be prioritised, and is configured to provide messages for one or more other participants in dependence on such determinations.

11. A non-transitory computer-readable storage medium storing computer program code to, when loaded into a computer system and executed thereon, cause the computer to perform the steps of a method as claimed in claim 1.

12. The method according to claim 1 wherein
    the signal indicating that the first participant is beginning to make the audio contribution is received at the at least one other user device from the first one of said user devices in the audio communication session with less transmission delay than a signal representing the audio contribution is received at the at least one other user device from the first one of said user devices in the audio communication session.

13. The method according to claim 1 wherein
    the audio representation of data previously stored at said at least one other user device is played by the at least one other user device before audio data representing the audio contribution received at the at least one other user device from the first one of said user devices is played by the at least one other user device.

14. The method according to claim 1 wherein
    in response to the detection that the first participant is beginning to make an audio contribution at the first one of said user devices after the period of silence in the audio communication session, suppress reproduction, at the first one of said user devices, of the audio contribution from the participant at the at least one other user device.

15. The method according to claim 1 wherein
the audio representation of data previously stored at said at least one other user device represents breathing sounds or short noises that constitute a start of speech from the first participant.

16. Apparatus for managing a streamed audio communication session between a plurality of user devices, the user devices being configured to send streamed data indicative of received audio contributions from respective participants in a multiple-participant audio communication session via a communications network to one or more other user devices for conversion to audio representations of said received audio contributions for one or more respective other participants; the apparatus comprising one or more processors operable to:
monitor audio contributions from respective participants, and in response to detection therefrom that a first participant is beginning to make an audio contribution at a first one of said user devices after a period of silence in the audio communication session, to provide a signal for at least one of said other user devices indicating that the first participant is beginning to make an audio contribution; and
in response to receipt at said at least one other user device of a signal indicating that the first participant is beginning to make an audio contribution, to trigger a predetermined audible indication for a respective participant at said at least one other user device indicating that said first participant is beginning to make an audio contribution;
wherein the predetermined audible indication for a respective participant at said at least one other user device indicating that said first participant is beginning to make an audio contribution is an audio representation of data previously stored at said at least one other user device, the data previously stored at said at least one other user device being a representation of a sound previously received from said first participant at said first user device and/or data determined in dependence on analysis of previously-received received audio contributions at said first user device.

17. The apparatus according to claim 16 wherein
the signal indicating that the first participant is beginning to make the audio contribution is received at the at least one other user device from the first one of said user devices in the audio communication session with less transmission delay than a signal representing the audio contribution is received at the at least one other user device from the first one of said user devices in the audio communication session.

18. The apparatus according to claim 16 wherein
the audio representation of data previously stored at said at least one other user device is played by the at least one other user device before audio data representing the audio contribution received at the at least one other user device from the first one of said user devices is played by the at least one other user device.

19. The apparatus according to claim 16 wherein
in response to the detection that the first participant is beginning to make an audio contribution at the first one of said user devices after the period of silence in the audio communication session, suppress reproduction, at the first one of said user devices, of the audio contribution from the participant at the at least one other user device.

20. The apparatus according to claim 16 wherein
the audio representation of data previously stored at said at least one other user device represents breathing sounds or short noises that constitute a start of speech from the first participant.

* * * * *